US008190641B2

(12) United States Patent
Ponnappan et al.

(10) Patent No.: US 8,190,641 B2
(45) Date of Patent: May 29, 2012

(54) SYSTEM AND METHOD FOR ADMINISTRATION OF VIRTUAL SERVERS

(75) Inventors: Senthilkumar Ponnappan, Bangalore (IN); Hemanth Pannem, Satyavedu (IN); Kartik Kumar, Gujarat (IN); Shailaja Kamila, Bangalore (IN); Anshu Surana, Surat (IN)

(73) Assignee: NetApp, Inc., Sunnyvale, CA (US)

( * ) Notice: Subject to any disclaimer, the term of this patent is extended or adjusted under 35 U.S.C. 154(b) by 569 days.

(21) Appl. No.: 11/845,456

(22) Filed: Aug. 27, 2007

(65) Prior Publication Data
US 2008/0195624 A1    Aug. 14, 2008

(30) Foreign Application Priority Data
Feb. 13, 2007  (IN) .............................. 282/DEL/2007

(51) Int. Cl.
*G06F 17/30* (2006.01)
(52) U.S. Cl. ...................................................... 707/786
(58) Field of Classification Search .................. None
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,432,907 A | 7/1995 | Picazo, Jr. et al. | |
| 5,485,579 A | 1/1996 | Hitz et al. | |
| 5,802,366 A | 9/1998 | Row et al. | |
| 5,819,292 A | 10/1998 | Hitz et al. | |
| 5,835,720 A | 11/1998 | Nelson et al. | |
| 5,931,918 A | 8/1999 | Row et al. | |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A | 5/2000 | Hitz et al. | |
| 6,167,446 A | 12/2000 | Lister et al. | |
| 6,230,200 B1 | 5/2001 | Forecast et al. | |
| 6,425,035 B2 | 7/2002 | Hoese et al. | |
| 6,457,130 B2 | 9/2002 | Hitz et al. | |
| 6,604,123 B1 | 8/2003 | Bruno et al. | |
| 6,647,422 B2 | 11/2003 | Wesinger et al. | |
| 6,742,034 B1* | 5/2004 | Schubert et al. | 709/226 |
| 6,895,429 B2 | 5/2005 | Banga et al. | |
| 7,055,014 B1* | 5/2006 | Pawlowski et al. | 711/202 |
| 7,194,519 B1* | 3/2007 | Muhlestein et al. | 709/215 |
| 8,041,761 B1* | 10/2011 | Banga et al. | 709/201 |

(Continued)

FOREIGN PATENT DOCUMENTS

EP    1 326 408    7/2003

OTHER PUBLICATIONS

Allison, Jeremy, Doing the NIS/NT Samba, LinuxWorld.com, Oct. 1, 1998, pp. 1-9.

(Continued)

*Primary Examiner* — Bai D. Vu
(74) *Attorney, Agent, or Firm* — Cesari and McKenna, LLP

(57) ABSTRACT

A system and method administers virtual servers executing on one or more physical storage systems. One or more virtual servers are created and associated with a management group. An administrator is then granted permissions to the group. Upon logging into management software, only information relating to the virtual servers associated with the group are displayed to the administrator, thereby limiting access to information related to other virtual servers and/or physical storage systems.

18 Claims, 17 Drawing Sheets

U.S. PATENT DOCUMENTS

| | | | | |
|---|---|---|---|---|
| 2002/0140743 | A1* | 10/2002 | DeLuca et al. | 345/835 |
| 2003/0159058 | A1* | 8/2003 | Eguchi et al. | 713/193 |
| 2004/0068561 | A1* | 4/2004 | Yamamoto et al. | 709/224 |
| 2005/0120160 | A1* | 6/2005 | Plouffe et al. | 711/1 |
| 2005/0228835 | A1* | 10/2005 | Roa | 707/204 |
| 2007/0297428 | A1* | 12/2007 | Bose et al. | 370/401 |

OTHER PUBLICATIONS

Banga, et al., U.S. Appl. No. 10/035,666, filed Dec. 28, 2001.

Celerra File Server Architecture for High Availability, Aug. 1999, EMC Corporation, NY.

Dougal, Richard MC., et al. "Resource Management," 1999, Prentice Hall, USA, ISBN: 0-13-025855-5, pp. iii-xxvii; Chapter 1; Chapter 2; Chapter 6; Chapter 7; Chapter 11; back cover.

Eckstein, R., et al. Eckstein, R., et al., Using Samba, Nov. 1999, O'Reilly & Associates., Using Samba, Nov. 1999, O'Reilly & Associates.

EMC Celerra File Server: Product Description Guide, Jun. 2000, EMC Corporation, NY.

European Search Report, Application No. EP 02 25 8949, Reference No. EPP87333, Mar. 9, 2007.

European Search Report for European Patent Application No. EP 02 25 8871.9, Filed: Dec. 23, 2002, all pages.

Glaude, David, "Virtual Server with Separate/Multiple Default Gateway/Routing," Mailing List LARTC Online, Nov. 9, 2001, pp. 1-3, XP-002256475.

IEEE-SA Standards Board, "Virtual Bridged Local Area Networks," IEEE Std 802.1Q-1998, Mar. 8, 1999, pp. 1-199.

Rekhter, Y., Network Working Group, Request for Comments 1918, entitled "Address Allocation for Private Internets," Feb. 1996, pp. 1-9.

z/Vm General Information: Version 3 Release 1.0, Second Edition, Jan. 2001, International Business Machines Corporation.

U.S. Appl. No. 10/836,817, entitled Extension of Write Anywhere File System Layout, by John K. Edwards, et al., on Apr. 30, 2004, 45 pages.

U.S. Appl. No. 10/035,666, entitled Technique for Enabling Multiple Virtual Filers on a Single Filer to Participate in Multiple Address Spaces with Overlapping Network Addresses, by Gaurav Banga, et al., on Dec. 28, 2001, 39 pages.

U.S. Appl. No. 10/035,664, entitled Architecture for Creating and Maintaining Virtual Filers on a Filer, by Mark Muhlestein, et al., on Dec. 28, 2001, 45 pages.

Hitz, Dave et al., File System Design for an NFS File Server Appliance, Technical Report 3002, Rev. C395, presented Jan. 19, 1994, 23 pages.

Fielding, et al., Hypertext Transfer Protocol—HTTP/1.1, Network Working Group, Request for Comments 2616, Jun. 1999, 143 pages.

SNIA, Common Internet File System (CIFS), Version CIFS-Spec 0.9, Storage Networking Industry Association, Mar. 2001, 126 pages.

* cited by examiner

Edit Quota Settings

ⓘ Started vFiler quota edit job: 4.

Edit quota for user "vfiler1" on qtree vf1:v1/q19

Disk Space Used — 0 bytes — 1605

Disk Space Hard Drive — [500 MB] — 1610
(Use suffixes KB, MB, GB, TB. Default is KB. Use - to indicate no limit)

Disk Space Soft Limit — [400 MB] — 1615

Disk Space Threshold — [*] — 1620

Files Used — 0 — 1625

Files Hard Limit — [*] — 1630
(Use suffixes million or billion. Use - for no limit)

Files Soft Limit — [*] — 1635

[Update] — 1640

Pending Jobs for vFiler Quota Edit — 1645

| Job ID | Submitted | Status |
|---|---|---|
| 4 | 04 Jan 01:13 | Running |

Pending Jobs for vFiler Quota Edit — 1650

| | Job ID | Submitted | Status |
|---|---|---|---|
| ☐ | 3 | 04 Jan 01:12 | Done |
| ☐ | 2  1660 | 04 Jan 01:12 | Done |

1655 — Select All - Unselect All

[Delete] — 1665

1600

04 Jan 01:13

FIG. 16

SYSTEM AND METHOD FOR ADMINISTRATION OF VIRTUAL SERVERS

RELATED APPLICATION

The present invention claims priority to commonly owned Indian Patent Application Serial No. 282/DEL/2007, entitled SYSTEM AND METHOD FOR ADMINISTRATION OF VIRTUAL SERVICES, by Senthilkumar Ponnappan et al., filed on Feb. 13, 2007, the contents of which are hereby incorporated by reference.

FIELD OF THE INVENTION

The present invention relates to administration of storage systems and, more specifically, to efficiently administering a plurality of virtual servers executing on one or more storage systems.

BACKGROUND OF THE INVENTION

A file server is a computer that provides services relating to the organization of information on persistent storage devices, such memories, tapes or disks. The file server or filer may be embodied as a storage system including a storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL®) file system available from Network Appliance, Inc., Sunnyvale, Calif. The WAFL file system is implemented as a microkernel within an overall protocol stack of the filer and associated disk storage. The disk storage is typically implemented as one or more storage "volumes" that comprise a cluster of physical storage devices (disks), defining an overall logical arrangement of disk space.

Certain storage systems provide the ability to create and maintain, with substantial flexibility and fine granularity, multiple instances of virtual servers, (vfilers), within a filer embodied as a physical storage system platform. A vfiler is a logical partitioning of network and storage resources of the physical storage system to establish an instance of a multi-protocol server. Each vfiler is maintained and executed independent of other vfilers on the platform. Storage system resources, such as units of storage and network addresses of network interfaces, may be grouped, partitioned and allocated to the vfilers to establish security domains within the storage system. Each of these per-vfiler security domains is defined by a vfiler context. Operations performed within a particular vfiler context may not access resources allocated to other vfilers. However, common storage system resources, such as a storage operating system and a file system, may be shared among the vfilers.

In operation, a storage service provider (SSP) may acquire a number of physical storage systems and configure them to operate as a plurality of vfilers. Customers of the SSP may lease one or more of the vfilers for use in provisioning storage for the customers' needs. In this way, the SSP leverages the high powered physical storage systems to share them across a plurality of customers without requiring customers to purchase such systems. Using the security features inherent within vfilers, customers of a SSP may not access data served by those vfilers to which they do not have permissions. However, a noted disadvantage arises when dealing with administration and/or management of the vfilers.

Typically, administration of a physical storage system enables administration of the vfilers operating thereon. However, in a SSP environment, customers may desire to manage their own vfilers despite not having permissions to manage the physical storage system, which is maintained by the SSP. Customers may individually log into their vfilers and execute configuration commands for their respective vfilers. However, such manual management increases the complexity of the system administrators' job and increases the likelihood of errors and/or mis-configurations arising due to, e.g., typographical errors when entering large numbers of commands into a plurality of vfilers. Furthermore, graphical administration tools may not be available by individually logging into each vfiler.

SUMMARY OF THE INVENTION

The present invention overcomes the disadvantages of prior art by providing a system and method for administration and/or management of virtual servers, such as vfilers, executing on one or more physical storage systems. Management software, executing on a management server, is configured to enable creation of vfiler administrators having access control permissions to one or more of the vfilers. When a vfiler administrator logs into the management software, only those vfilers with which the administrator has permissions are displayed. Furthermore, details regarding the physical storage systems executing the vfilers are hidden to thereby prevent confidential information related to a first vfiler from potentially being obtained by another vfiler administrator.

In operation, an administrator of the physical storage system first creates one or more vfilers. The created vfilers may then be assigned to a particular management group using the novel management software. A management group is a management entity comprising a collection of management objects, such as physical storage systems, virtual servers, aggregates, volumes, qtrees, etc. that are logically organized to facilitate management thereof. A vfiler administrator is thereafter created and given access control permissions to the group. Notably, the management software limits information visible to the vfiler administrator to only information associated with the vfilers and other objects that are part of the group.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 16 is a screenshot of a GUI window illustrating the editing of quota settings in accordance with an illustrative embodiment of the present invention.

DETAILED DESCRIPTION OF AN ILLUSTRATIVE EMBODIMENT

A. Storage System Environment

Figure 1:
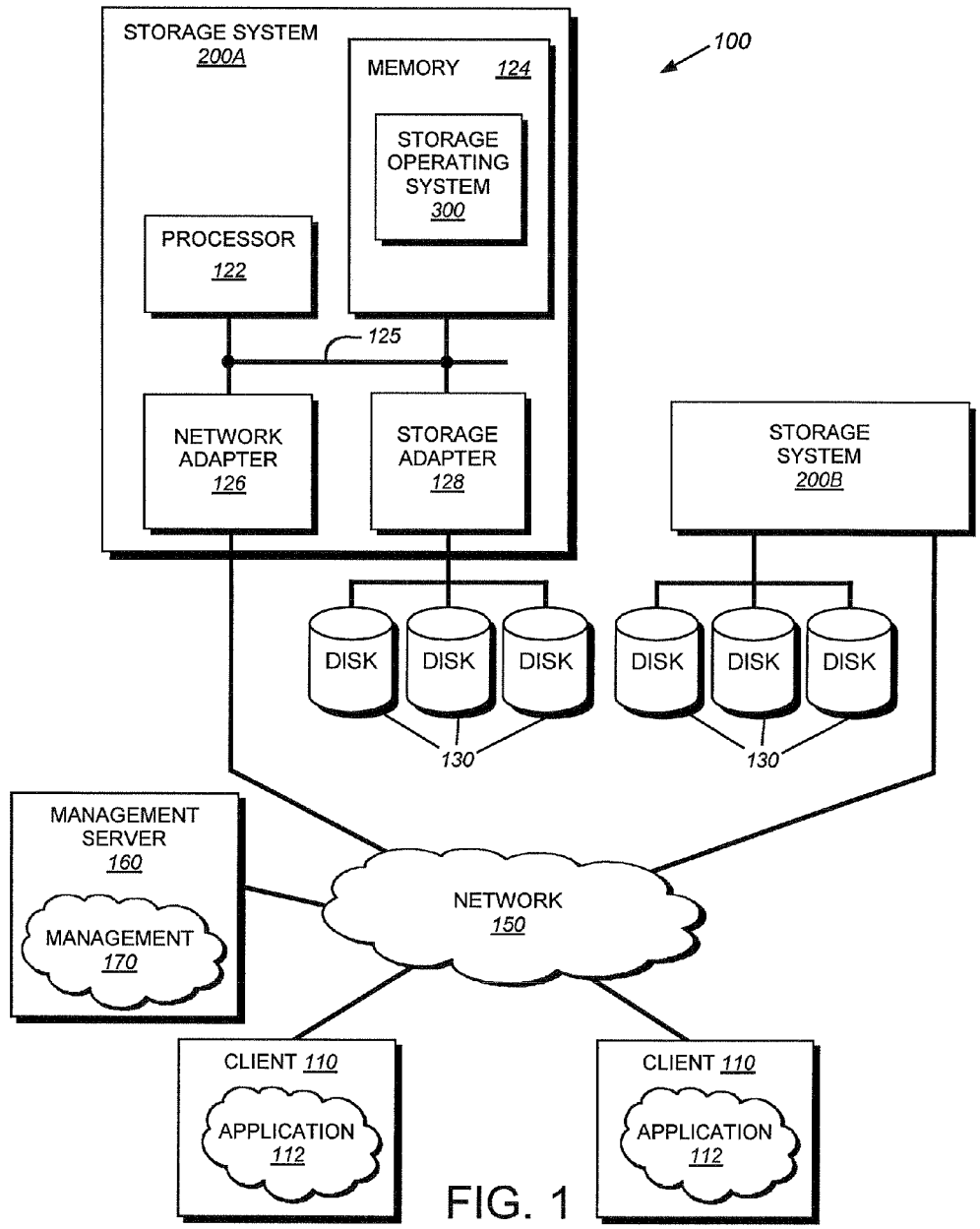
FIG. 1 is a schematic block diagram of a computer network including a plurality of storage systems that may be advantageously used with the present invention.

FIG. 1 is a schematic block diagram of a network environment 100 including a plurality of physical storage systems 200A, B which may be advantageously used with the present invention. Each storage system 200 is a computer that provides data access service relating to the organization of information on storage devices, such as disks 130. Each storage system 200 may be embodied as a filer and comprises a processor 122, a memory 124, a network adapter 126 and a storage adapter 128 interconnected by a system bus 125. Each storage system 200 also includes a storage operating system 300 that implements a file system to logically organize the information as a hierarchical structure of directories and files on the disks.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which is typically resident in memory and executed by the processing elements, functionally organizes the storage system by, inter alia, invoking storage operations in support of storage services implemented by the storage system. It will be apparent to those skilled in the art that other processing and memory means, including various computer readable media, may be used for storing and executing program instructions pertaining to the inventive technique described herein.

The network adapter 126 may comprise a network interface card (NIC) having the mechanical, electrical and signaling circuitry needed to connect the storage system 200 to one or more clients 110 over a computer network 150. Each client 110 may be a general-purpose computer configured to execute applications 112. Moreover, each client 110 may interact with the storage system 200 in accordance with a client/server model of information delivery. That is, the client may request the services of the storage system, and the storage system may return the results of the services requested by the client, by exchanging packets encapsulating, e.g., the Common Internet File System (CIFS) protocol or Network File System (NFS) protocol format over the network 150.

The storage adapter 128 cooperates with the storage operating system 300 executing on the storage system to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel serial link topology. The storage adapter retrieves the information that, if necessary, is processed by the processor 122 (or the adapter 128 itself) prior to being forwarded over the system bus 125 to the network adapter 126, where the information is formatted into a packet and returned to the client 110.

Storage of information on the storage system is preferably implemented as one or more storage "volumes" that comprise a cluster of physical storage disks 130, defining an overall logical arrangement of disk space. Each volume is generally associated with its own file system. To facilitate access to the disks 130, the storage operating system 300 implements a write-anywhere file system that logically organizes the information as a hierarchical structure of directories and files on the disks. Each "on-disk" file may be implemented as set of disk blocks configured to store information, such as data, whereas the directory may be implemented as a specially formatted file in which names and links to other files and directories are stored.

In alternate embodiments, physical storage may be organized as aggregates, with logical flexible (or virtual) volumes created within the aggregate. Aggregates and flexible/virtual volumes are further described in U.S. patent application Ser. No. 10/836,817, entitled EXTENSION OF WRITE ANYWHERE FILE SYSTEM LAYOUT, by John K. Edwards et al., the contents of which are hereby incorporated by reference.

A management server 160, operatively interconnected with the network 150, executes novel management software 170 that enables the administration of vfilers in accordance with an embodiment of the present invention. Illustratively, the management server 160 may be a personal computer. However, it should be noted that in alternate embodiments the management server 160 may be a dedicated computer. As such, the description of the management server 160 being a general purpose computer should be taken as exemplary only. The management software 170 illustratively provides a graphical user interface (GUI) for management of a plurality of physical storage systems and/or vfilers in accordance with an illustrative embodiment of the present invention. The management software 170, described further below, may also provide a command line interface (CLI) for administrators to enter commands for management of the vfilers and/or physical storage systems.

In an illustrative embodiment of the present invention, environment 100 may represent a storage service provider (SSP) environment. As noted above, a SSP may be a business entity that acquires and manages a plurality of physical storage systems and leases one or more vfilers to customers. In such an embodiment, the physical storage systems 200 are often owned and managed by the SSP. The SSP then leases vfilers and storage capacity of the physical storage systems to one or more customers, whose clients 110 access the leased vfilers.

While a single management server 160 and its management software 170 are shown in environment 100, a plurality of management servers 160 and/or instantiations of management software 170 may be utilized in accordance with alternate embodiments of the present invention. As such, the description of a single management server 170 is to be taken as exemplary only. For example, in a SSP environment, each customer of the SSP may include its own management server 160 and/or management software 170 to enable management of one or more vfilers associated with the customer.

B. Vfilers

Figure 2:
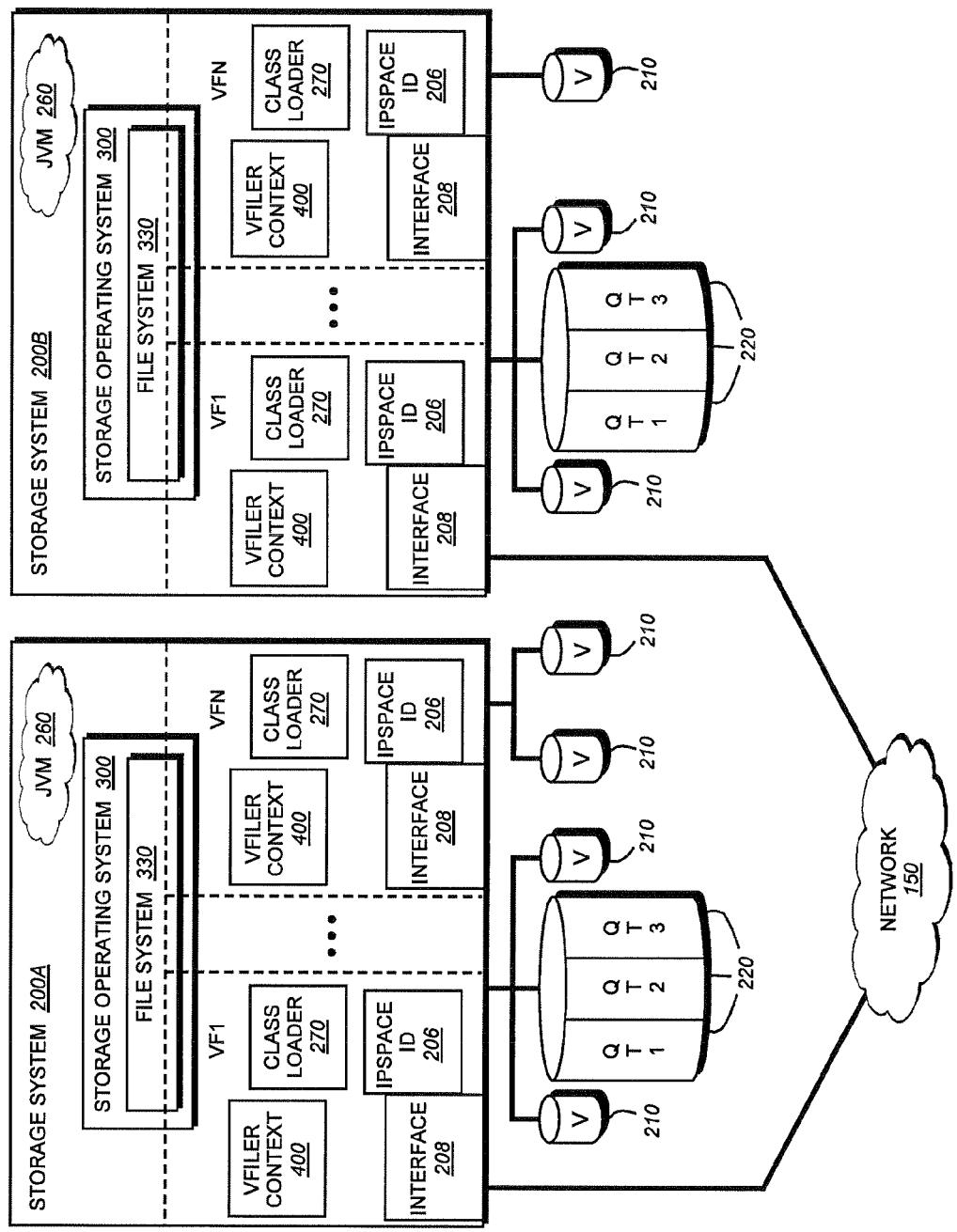
FIG. 2 is a schematic block diagram of a storage operating system that may be advantageously used with the present invention.

FIG. 2 is a schematic diagram of an embodiment of a plurality of physical storage systems 200 that may be advantageously used with the present invention. Each physical storage system (or filer) is organized into one or more logical virtual filers (vfilers), each of which may be embodied as a server, e.g., a CIFS server, and referenced by a logical name, e.g., VF1-VFN. A vfiler is a logical partitioning of network and storage resources of the storage system to establish an instance of a multi-protocol server. Each vfiler is maintained and executed independent of other vfilers on the platform. Storage system resources, such as units of storage and network addresses of network interfaces, may be grouped, partitioned and allocated to the vfilers to establish security domains within the storage system. Each of these per-vfiler security domains is defined by a vfiler context. Operations performed within a particular vfiler context may not affect (access) resources allocated to other vfilers. However, common storage system resources, such as a storage operating system and a file system, may be shared among the vfilers. Each vfiler is configured to serve ("host") data, such as a data set, for a user or client.

Each vfiler VF1-VFN is configured with one or more network addresses, such as Internet Protocol (IP) addresses, that may be assigned to one or more network interfaces 208. In this context, the term network interface refers to an IP addressable interface, including a "physical" NIC and a "soft" NIC, such as a virtual interface (VIF), a virtual local area network (VLAN) and an emulated LAN (ELAN). Each network interface is further assigned an IPspace identifier (ID) 206 that essentially "binds" the interface to an IPspace. An IPspace refers to each distinct IP address space in which vfiler and its storage operating system participate. Each vfiler is associated with an IP address space and, thus, belongs to one IPspace. The IPspace is further described in U.S. patent application Ser. No. 10/035,666 entitled, TECHNIQUE FOR ENABLING MULTIPLE VIRTUAL FILERS ON A SINGLE FILER TO PARTICIPATE IN MULTIPLE ADDRESS SPACES WITH OVERLAPPING NETWORK ADDRESSES, filed on Dec. 28, 2001, and which is hereby incorporated by reference as though fully set forth herein.

The units of storage resources allocated to each vfiler include a volume or subvolume (qtree). A volume (V) 210 is a unit of storage comprising a file system or hierarchy of directories and files. A qtree, QT1-3 220, is a special directory similar to a minivolume (mini-file system) or subdivision of a volume that has the property of being able to identify itself within a file system by, e.g., a qtree identifier (qtreeid) stored within an inode of a file. Qtrees contain information that enables administrators to set quotas for storage space utilization. The vfiler architecture provides efficient utilization and management of these storage resources, including creation, assignment and mapping of the resources to and among the vfilers. For example, a virtual server (such as vfiler) and its associated storage resources (such as qtrees) may be migrated to a server (such as a filer) and consolidated with other virtual servers (vfilers) having similarly named resources. Since the storage resources are allocated on a per-vfiler basis, storage migration is transparent to a client because there is no change in the way the client refers to its data.

In the illustrative embodiment, each physical storage system 200 includes a single Java Virtual Machine (JVM) 260 that is utilized by each vfiler executing on the physical storage system. However, each vfiler may have an individual class loader 270 to enable Java based applications to be executed within a particular vfiler context.

Each instance of a vfiler is described by "external" and "internal" configuration. External configuration describes the resources assigned to a vfiler (e.g., one or more IP addresses and one or more units of storage, such as an entire volume or a qtree on a volume) and capabilities available to a vfiler (e.g., protocols allowed to run on the vfiler). Internal configuration (i.e., internal to the vfiler) controls operation of various protocol modules or "vfiler options" associated with the vfiler. Examples of such options include whether a network information system (NIS) server is to be used with the vfiler and whether a particular protocol, such as NFS, uses TCP or UDP as its underlying transport.

C. Storage Operating System

As noted, to facilitate access to the disks 130, the storage operating system 300 illustratively implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
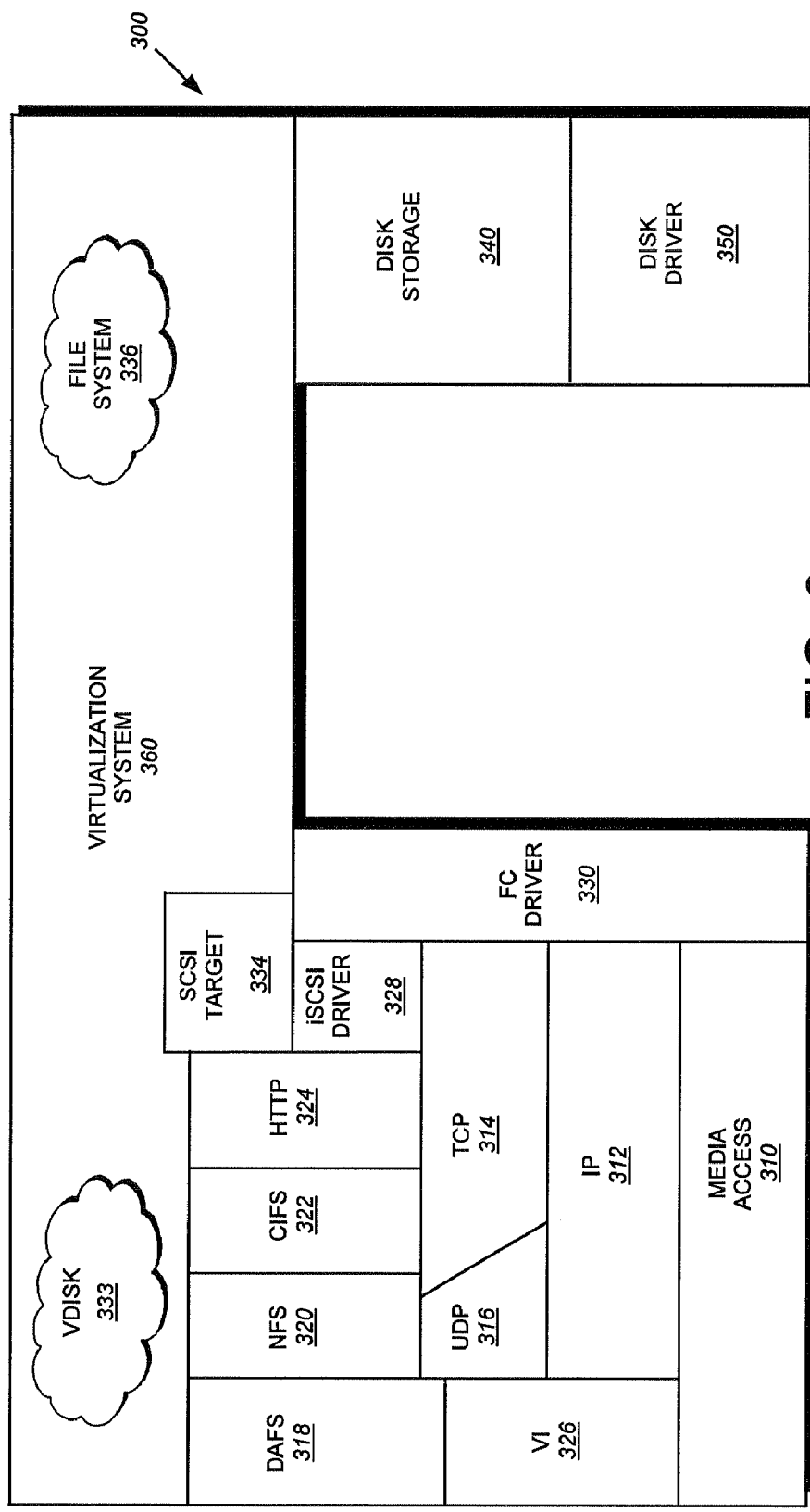
FIG. 3 is a schematic diagram of an embodiment of a storage system platform having a plurality of virtual storage systems (vfilers) that may be advantageously used with the present invention.

FIG. 3 is a schematic block diagram of an exemplary storage operating system 300 that may be advantageously used with the present invention. The storage operating system comprises a series of software layers/modules organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318 the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a disk storage module 340 embodied as a RAID system that manages the storage and retrieval of information to and from the volumes/disks in accordance with I/O operations, and a disk driver system 350 that implements a disk access protocol such as, e.g., the SCSI protocol.

Bridging the disk software layers with the integrated network protocol stack layers is a virtualization system 360 that is implemented by a file system 336 interacting with virtualization modules illustratively embodied as, e.g., vdisk module 333 and SCSI target module 334. The vdisk module 333 is layered on the file system to enable access by administrative interfaces, such as a user interface, in response to a user (system administrator) issuing commands to the storage system. The SCSI target module 334 is disposed between the FC and iSCSI drivers and the file system to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system provides functions normally associated with a volume manager. These functions include (i) aggregation of the disks, (ii) aggregation of storage bandwidth of the disks, and (iii) reliability guarantees, such as mirroring and/or parity (RAID). The file system illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client is forwarded as a packet over the computer network 150 and onto storage system 200 where it is received at the network adapter 126 associated with, e.g., a network interface 208 of a vfiler. A network driver (of layer 310 or layer 332) processes the packet and, if appropriate, passes it on to a network protocol and file access layer for additional processing prior to forwarding to the write-anywhere file system 336. Here, the file system generates operations to load (retrieve) the requested data from disk if it is not resident "in core," i.e., in memory 124. If the information is not in the memory, the file system indexes into the inode file using the inode number to access an appropriate entry and retrieve a logical vbn. The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk and loads the requested data block(s) in memory 124 for processing by vfiler. Upon completion of the request, vfiler (and operating system) returns a reply to the client over the network 150.

It should be noted that the software "path" through the storage operating system layers described above needed to perform data storage access for the client request served by the vfiler may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the vfiler in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage services provided by the storage system. It is expressly contemplated that the various processes, architectures and procedures described herein can be implemented in hardware, firmware or software.

As used herein, the term "storage operating system" generally refers to the computer-executable code operable to perform a storage function in a filer, e.g., that manages data access and may, in the case of a file server, implement file system semantics. In this sense, the Data ONTAP® software is an example of such a storage operating system implemented as a microkernel and including a file system 336 to implement the WAFL® file system semantics and manage data access. The storage operating system can also be implemented as an application program operating over a general-purpose operating system, such as UNIX® or Windows XP®, or as a general-purpose operating system with configurable functionality, which is configured for storage applications as described herein.

D. Vfiler Contexts

Figure 4:
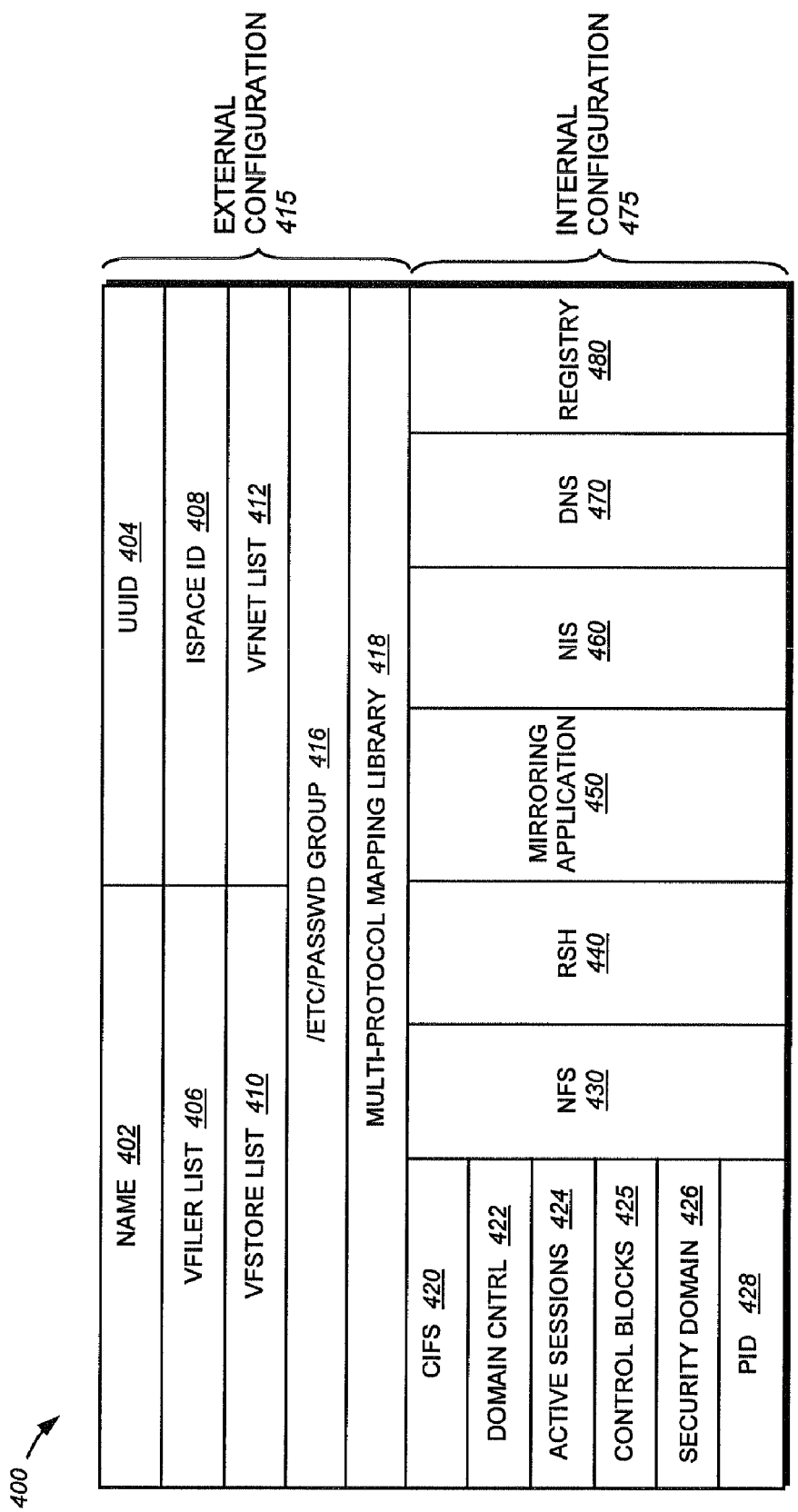
FIG. 4 is a schematic block diagram illustrating a vfiler context data structure that may be advantageously used with the present invention.

FIG. 4 is a schematic block diagram illustrating an in core representation of a vfiler context 400 containing external configuration 415 and internal configuration 475 or "state" needed to establish an instance of a multi-protocol server. The management software 170 utilizes information within vfiler contexts 400 to enable the proper segregation of administration information in accordance with an illustrative embodiment of the present invention. The vfiler context 400 includes fields for holding a name 402 of the vfiler and a universally unique identifier (UUID 404) that is created with the vfiler context. A vfiler list field 406 contains a list of vfilers on the physical storage system platform and an IPspace indicator (ID) field 408 holds the IPspace ID of the vfiler. Other fields hold a list 410 of vfiler storage (vfstore) structures (soft objects) and a list 412 of vfiler network (vfnet) soft objects.

Specifically, the vfstore list 410 comprises pointers to vfstore soft objects, each of which has a pointer that references a path to a unit of storage resource, such as a qtree or volume, allocated to the vfiler. Thus, the soft objects reference virtualize storage objects as opposed to hard objects, such as a disk or partition. The vfnet list 412 comprises pointers to vfnet soft objects, each of which has a pointer that references an interface address data structure representing an IP address assigned to the vfiler. Each vfnet object represents a "floating" capability that may be assigned to any network interface, e.g., a NIC, when an IP address is assigned to that NIC. If multiple IP addresses are assigned to the NIC, the capabilities of the NIC are effectively shared between multiple vfnet objects and, thus, potentially different vfilers. If only a single IP address is associated with an interface, only one vfnet object, and therefore only one vfiler, uses the capabilities of the NIC. The vfstore and vfnet objects are further described in U.S. patent application Ser. No. 10/035,664 entitled, ARCHITECTURE FOR CREATING AND MAINTAINING VIRTUAL FILERS ON A FILER, filed on Dec. 28, 2001, which is hereby incorporated by reference as though fully set forth herein.

Each vfiler context 400 further includes information pertaining to the security domain of the vfiler to thereby enable controlled access to allocated and shared resources of the vfiler. In particular, each vfiler context has a pointer to /etc/passwd,group files 416 containing a user ID and group ID associated with each user password. The vfiler context structure 400 also implements a multi-protocol feature that supports multiple different clients having different types of security, and the ability to map those different client security types to different vfilers of a filer. The vfiler context implements this feature by providing a pointer that references a multi-protocol mapping library file 418 that enables translation of permission checking attributes from one protocol to another (e.g., NFS to NT security).

Each vfiler context 400 includes a plurality of "module" data structures that includes all information (such as global variables) needed for an instance of a particular protocol or subsystem. For example, a CIFS module data structure 420 contains all information needed for an instance of the CIFS protocol, including information about contacting a domain controller 422, active sessions 424 for the protocol and various control blocks 425 associated with the CIFS protocol. Information pertaining to a security domain 426 is also provided to enable NT-type security for a CIFS request. The security information includes a security identifier comprising a domain portion and a relative ID (RID) portion, the latter RID being similar to the user ID of UNIX security. Each CIFS module 420 also contains a process ID (PID 428) of the CIFS authentication process that enables the CIFS layer to send an authentication request to the correct CIFS authentication process.

There is a similar "per-module" data structure for each of the protocols and subsystems associated with a vfiler including, but not limited to, the NFS protocol 430, Remote SHell (RSH) protocol 440, mirroring applications 450, NIS subsystem 460, domain name service (DNS) subsystem 470 and registry 480. The NIS subsystem or "yellow pages" is a service locator for the NFS protocol that is implemented as a distributed database storing security information, such user and group IDs associated with each user password. The NIS subsystem module 460 includes information for contacting a NIS controller when access to the distributed security database is required (using, e.g., the /etc/passwd,group information stored in file 416). The DNS subsystem facilitates resolution of a DNS name to a corresponding IP address.

The registry is a repository for configuration information pertaining to the hardware, software and users of vfiler (and each vfiler). Each vfiler has its own per-vfiler registry, which is the only registry space "visible" when running in a per-vfiler context. All per-vfiler options and certain configuration data are stored in this per-vfiler registry. Other per-vfiler configuration information is stored in the /etc store associated with each vfiler. For example, configuration information that a vfiler administrator may need to access (such as a passwd file) is stored in the /etc directory off the root of the vfiler's volume.

The external configuration information 415 used to describe an instance of a vfiler is preferably stored "on-disk" in the global registry of the physical storage system (which is typically stored on the root volume of the storage system), whereas the internal configuration 475 is stored in a private registry in the storage assigned to the vfiler.

E. Administration of Vfilers

The present invention provides a system and method for administration and/or management of virtual servers, such as vfilers, executing on one or more physical storage systems. Management software, executing on a management server, is configured to enable creation of vfiler administrators having access control permissions to one or more of the vfilers. When a vfiler administrator logs into the management software, only those vfilers with which the administrator has permissions are displayed. Furthermore, details regarding the physical storage systems executing the vfilers are hidden to thereby prevent confidential information from potentially being obtained by another vfiler administrator.

In operation, an administrator of the physical storage system first creates one or more vfilers using, e.g., a conventional vfiler creation technique. The created vfilers may then be assigned to a particular management group using the novel management software. A management group is a management entity comprising a collection of management objects, such as physical storage systems, virtual servers, aggregates, volumes, qtrees, etc. that are logically organized to facilitate management thereof. A vfiler administrator is thereafter created and given access control permissions to the group. Notably, the management software limits information visible to the vfiler administrator to only information associated with the vfilers and other objects that are part of the group.

Figure 5:
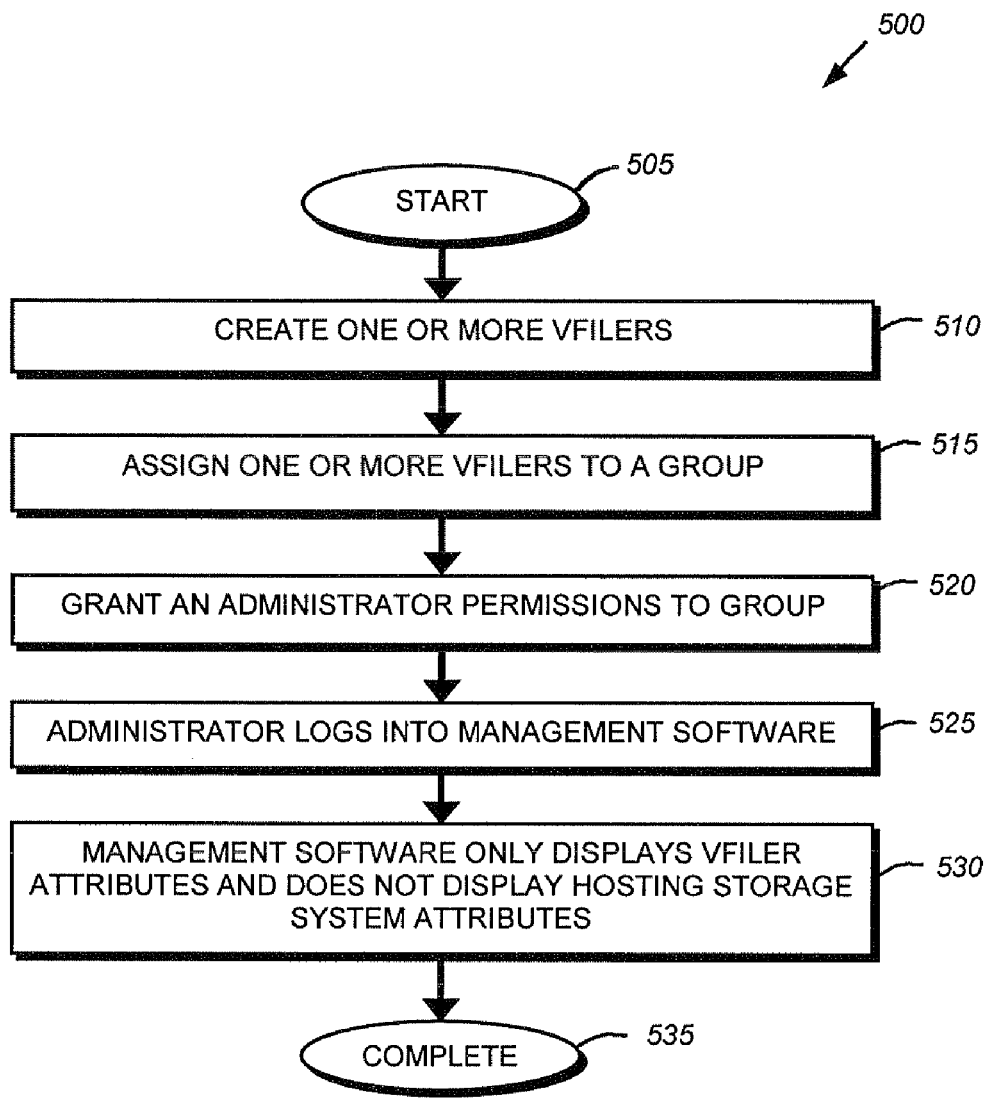
FIG. 5 is a flow chart detailing the steps of a procedure for administration of a plurality of virtual servers in accordance with an illustrative embodiment of the present invention.

FIG. 5 is a flowchart detailing the steps of a procedure 500 for the administration and/or management of a plurality of vfilers in accordance with an embodiment of the pre-sent invention. The procedure 500 begins in step 505 and continues to step 510 where an administrator of the physical storage system creates one or more vfilers. Such creation of vfilers may be performed using conventional vfiler management tools, such as that described in U.S. patent application Ser. No. 10/035,664, entitled ARCHITECTURE FOR CREATING AND MAINTAINING VIRTUAL FILERS ON A FILER, by Mark Muhlestein, et al., the contents of which are hereby incorporated by reference. Illustratively, the management software 170 is utilized by an administrator of the physical storage system to generate the one or more vfilers. Once created, the one or more vfilers may be assigned to a management group in step 515. As noted, a management group is illustratively a management entity associated with the management software to enable a plurality of management objects to be managed collectively. It should be noted that not all of the created vfilers need to be assigned to a single group. In alternate embodiments, the vfilers may be assigned to a plurality of groups, i.e., certain vfilers may be assigned to a first group while others are assigned to second group, etc. In the example of a SSP environment, each client or customer of the storage service provider may be a separate group. In such an example, all vfilers created for use by the customer are assigned to the group associated with the customer.

Once the vfiler is assigned to a group, a vfiler administrator may be granted permissions to the group in step 520. This may be performed by, e.g., the physical storage system administrator granting certain permissions to the vfiler administrator. The vfiler administrator then logs into the management software in step 525 using, e.g., a username/password or other acceptable authentication techniques. In response to the vfiler administrator logging into the management software, the management software only displays vfiler attributes associated with those vfilers contained within the group to which the administrator has permissions. In other words, the management software does not display attributes of the hosting physical storage system, i.e., attributes associated with the physical storage systems running the vfilers. Furthermore, vfiler administrators are only permitted to execute commands on a vfiler directly and not on a hosting physical storage system. This ensures that vfiler administrators may not obtain confidential information regarding other vfilers not in the vfiler administrator's group and/or physical storage systems within an environment.

Figure 6:
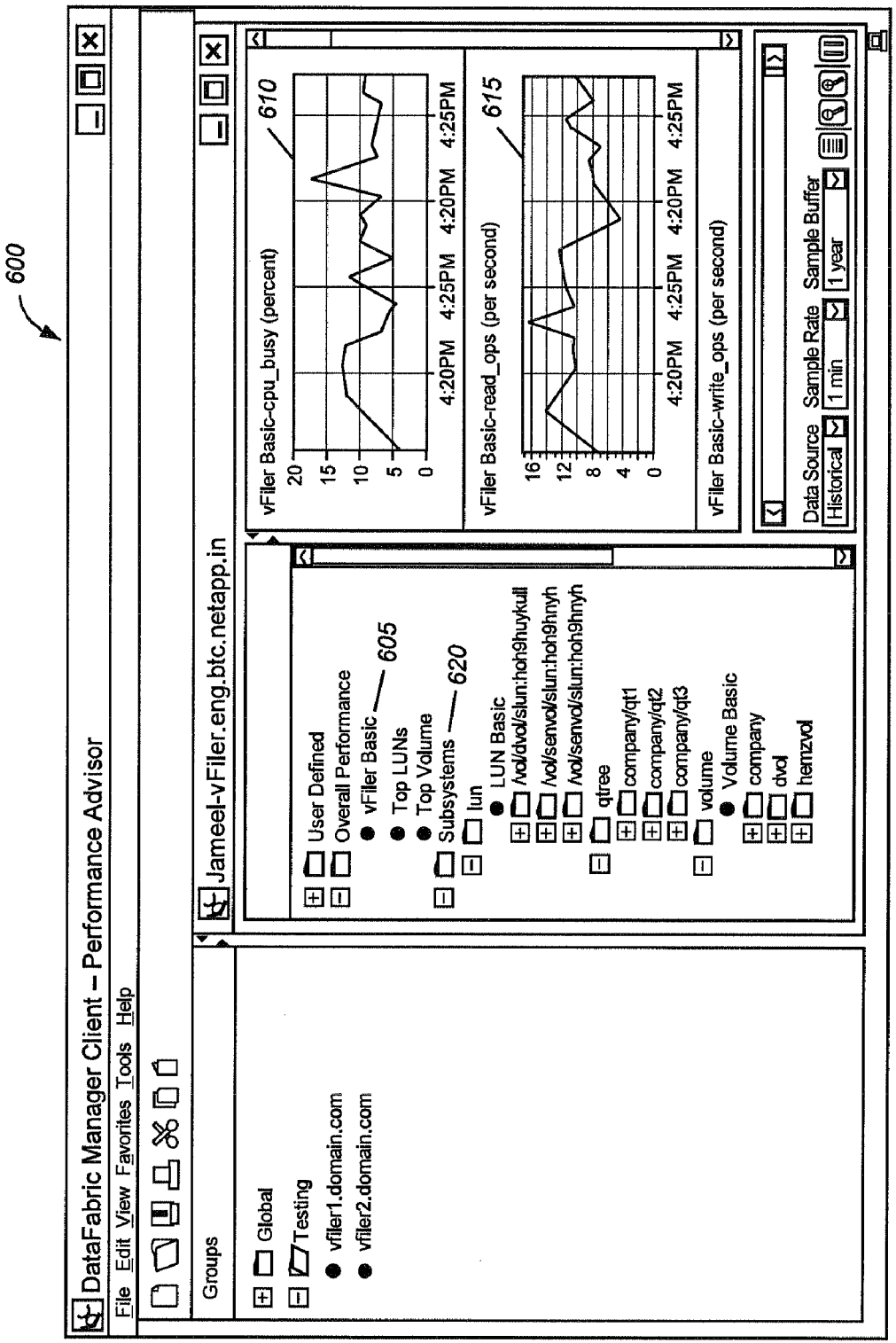
FIG. 6 is a screenshot of an exemplary GUI window illustrating vfiler performance in accordance with an illustrative embodiment of the present invention.

In the illustrative embodiment, the management software implements a graphical user interface (GUI) that enables the vfiler administrator to manage a group of vfilers and/or other entities. FIG. 6 is a screenshot of a graphical user interface window 600 displaying a vfiler performance advisor in accordance with an embodiment of the present invention. The window 600 includes a menu for selection types of performance to be displayed including, e.g., a basic vfiler performance option 605 and/or subsystems menu 620. A central processing unit (CPU) percentage utilized graph 610 is displayed within window 600, as is a number of read operations per second graph 615. It should be noted that in the illustrative embodiment such performance advisor graphs are displayed to a vfiler administrator. However, such performance advisor graphs within window 600 are not available to vfilers that are not associated with groups to which the administrator has permissions, nor is window 600 displayable for the physical storage system hosting the vfilers unless the vfiler administrator has permissions to the physical storage system.

Figure 7:
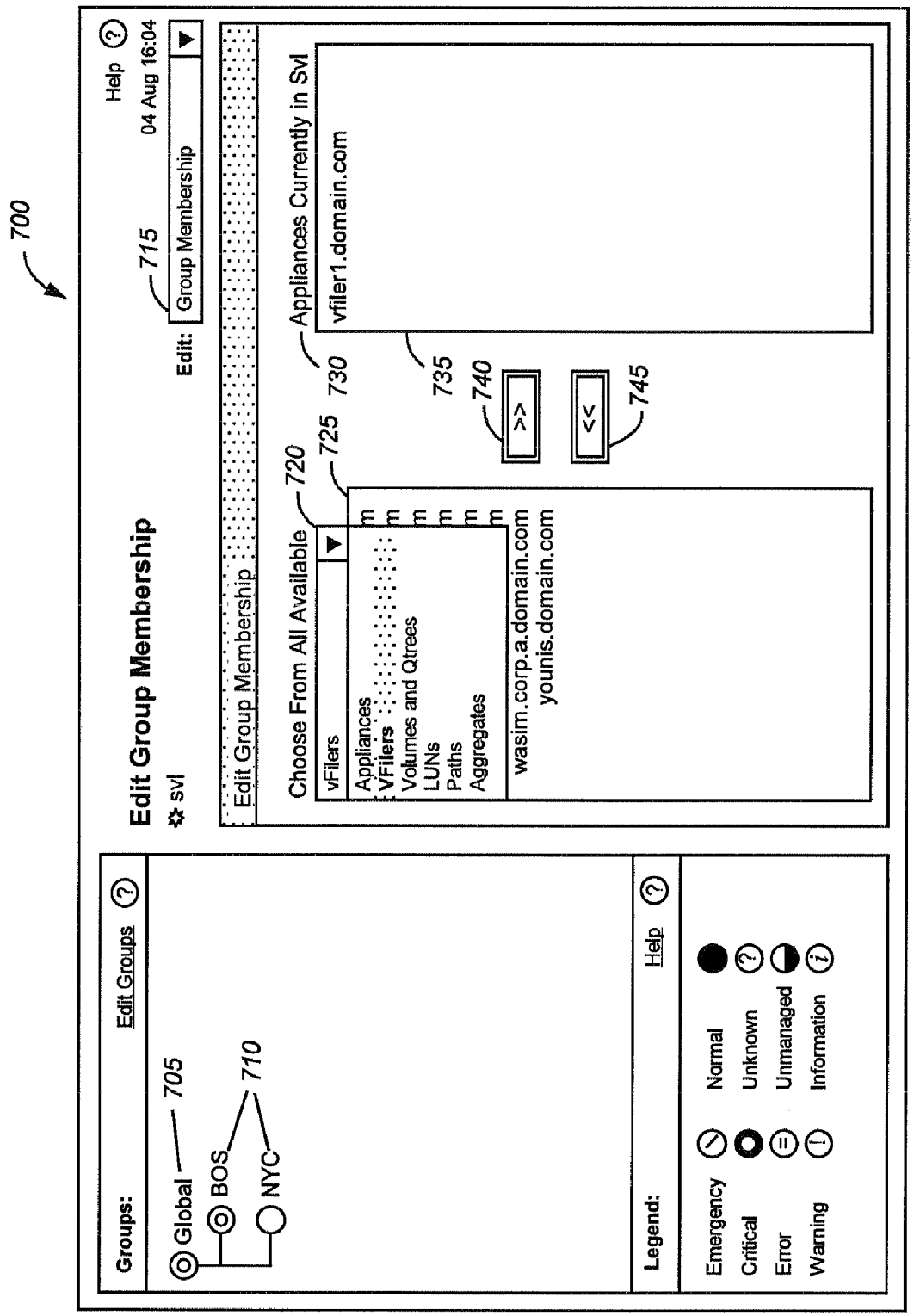
FIG. 7 is a screenshot of a GUI window illustrating the editing of group membership in accordance with an illustrative embodiment of the present invention.

As described above and with reference to step 515, an administrator may assign one or more vfilers to a management group. FIG. 7 is an illustrative screenshot of a graphical user interface window 700 showing editing of group membership to add one or more vfilers to a management group in accordance with an embodiment of the present invention. The window 700 displays a list of groups including, e.g., a global list 705 containing one or more entries 710. By selecting one of the entries 710, an administrator may edit the group membership. The administrator may select an entry by, for example, selecting a drop-down menu 715 to edit group membership. Once the group has been selected from entry 710 and the appropriate determination has been made to edit the group membership from menu 715, the administrator may select drop-down menu 720 to choose available types of management items to be added including, for example, vfilers 725. By selecting (highlighting) one or more vfilers from a list of available vfilers and depressing (activating) an add button 740, an administrator may move a vfiler to a list of currently selected vfilers 730 for the management group. Similarly, by highlighting a vfiler and activating a remove button 745, a vfiler may be removed from the particular group.

Figure 8:
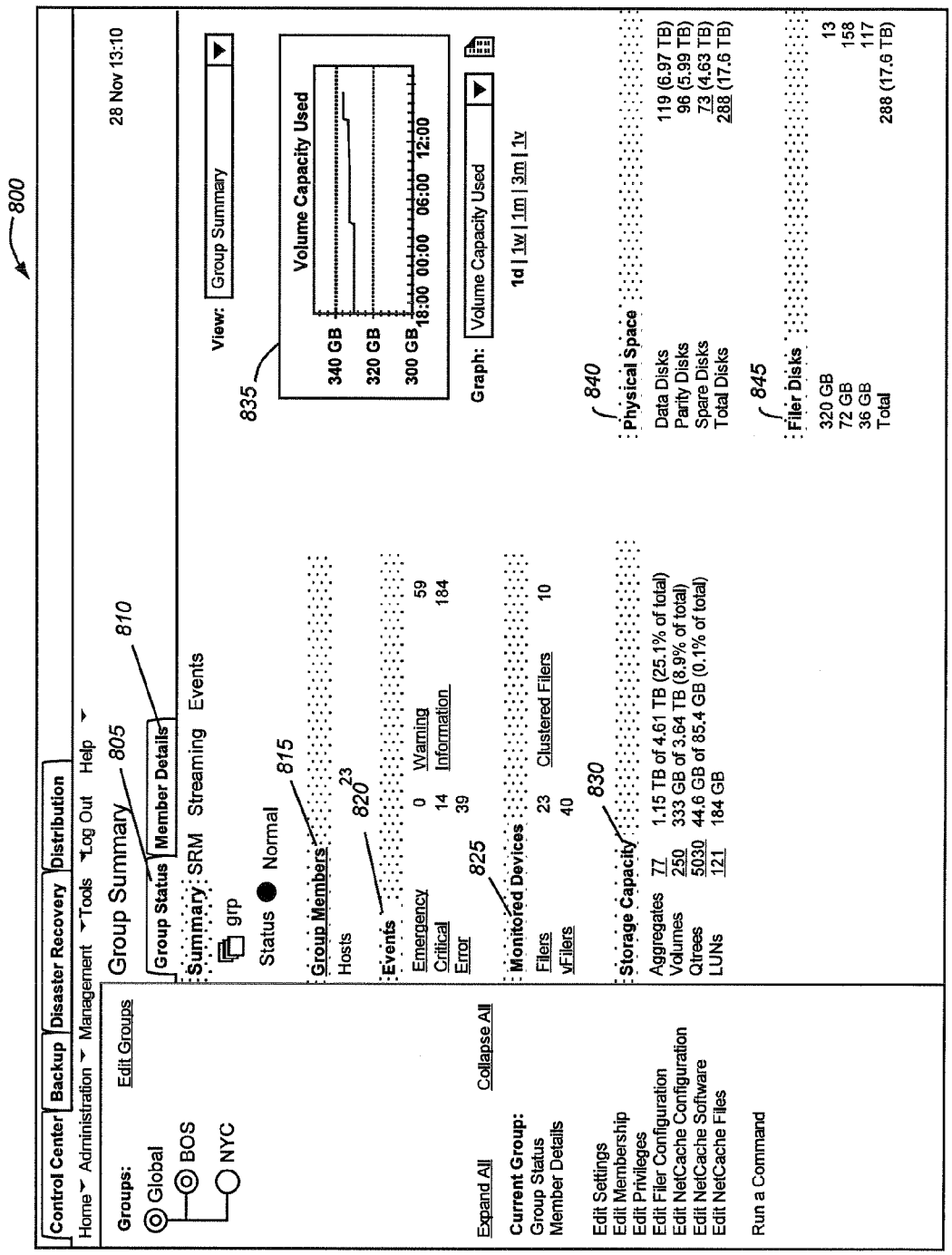
FIG. 8 is a screenshot of a GUI window illustrating group summary information in accordance with an illustrative embodiment of the present invention.

FIG. 8 is a screenshot of a graphical user interface window 800 illustrating group summary information in accordance with an embodiment of the present invention. To that end, the window includes a tab for group status 805 and a tab for member details 810. As shown in window 800, the group status tab 805 has been selected. The window 800 further includes a group members field 815, an events field 820, a monitored devices field 825, a storage capacity field 830, a physical space field 840 and a filer/storage system disks field 845. The group members field 815 identifies the number of hosts within the group. As used herein, a host may comprise a physical storage system. The events field 820 identifies the type and number of various events monitored by the hosts of the group. The monitored devices field 825 identifies the number of storage systems, clustered storage systems and/or vfilers monitored in the group. The storage capacity field 830 identifies a total storage space size consumed by aggregates, volumes, qtrees and/or luns within the group. Similarly, the physical space field 840 identifies a total amount of storage space available on disks, including data disks, parity disks and/or spare disks, within the group. The storage system disks field 845 identifies a number and size of each of the disks connected to the storage systems monitored. The window 800 further includes a volume capacity used graph 835 that shows the amount of storage space utilized by the various volumes within the group. In accordance with an illustrative embodiment of the present invention, certain fields, e.g., physical space field 840, filer disks field 845 and information relating to aggregates are not displayed to vfiler administrators.

Figure 9:
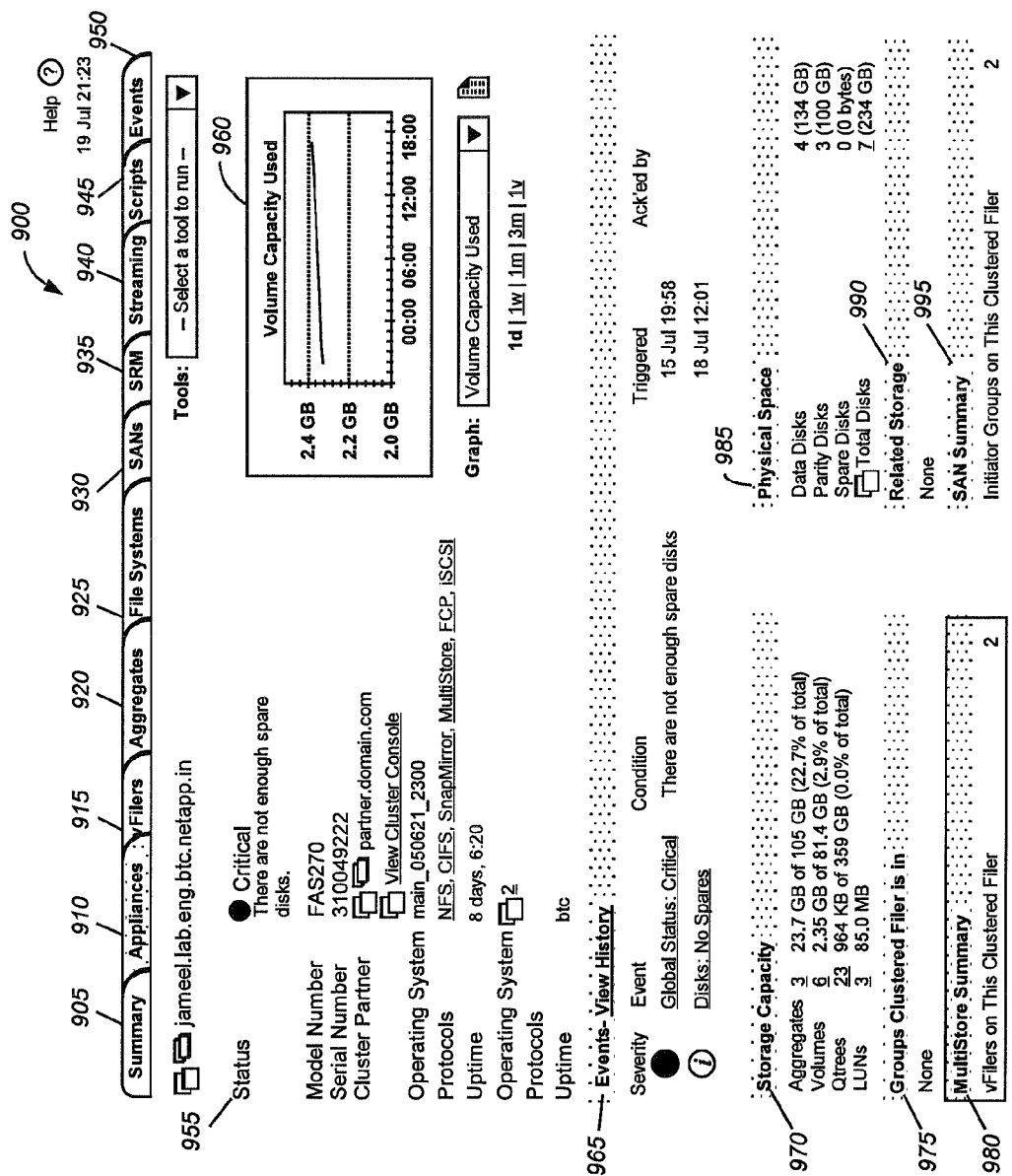
FIG. 9 is a screenshot of a GUI window illustrating details relating to a storage system in accordance with an illustrative embodiment of the present invention.

FIG. 9 is a screenshot of a graphical user interface window 900 illustrating storage system details in accordance with an embodiment of the present invention. Along the top of the window 900 is a set of tabs including, for example, a summary tab 905, an appliances tab 910, a vfilers tab 915, an aggregates tab 920, a file systems tab 925, a SANs tab 930, a SRM tab 935, a streaming tab 940, a scripts tab 945 and an events tab 950. As can be seen from window 900, the appliances tab has 910 has been selected. It should be noted that the term "appliance", i.e., storage appliance, may be used interchangeably with the term storage system. The window 900 also includes an overview field 955 displaying such information as status, model number, serial number, cluster partner, operating system, protocols, etc. associated with the storage system. For example, the status of the overview field 955 displays the current status of the storage system, the model number identifies the model number of the physical storage system, and the protocols display the various protocols that may be utilized by the storage system.

The window 900 also includes a volume capacity used graph 960 that monitors a total volume storage capacity utilized by the physical storage system. An events field 965 tracks events related to the storage system. A storage capacity field 970 identifies a number and size of aggregates, volumes, qtrees and/or luns associated with a particular storage system. Similarly, the physical space field 985 identifies the size and types of data, parity and spare disks associated with the physical storage system. A cluster field 975 identifies a computer or group(s) of which the storage system is a member. A related storage field 990 identifies other related storage. A multi-store summary field 980 identifies the number of vfilers executing on the storage system. A SAN summary field 995 identifies the total number of initiator groups executing on the storage system. As noted, the window 900 will not be displayed to a vfiler administrator unless the administrator has permissions to the physical storage system, as opposed to vfilers executing on a physical storage system.

Figure 10:
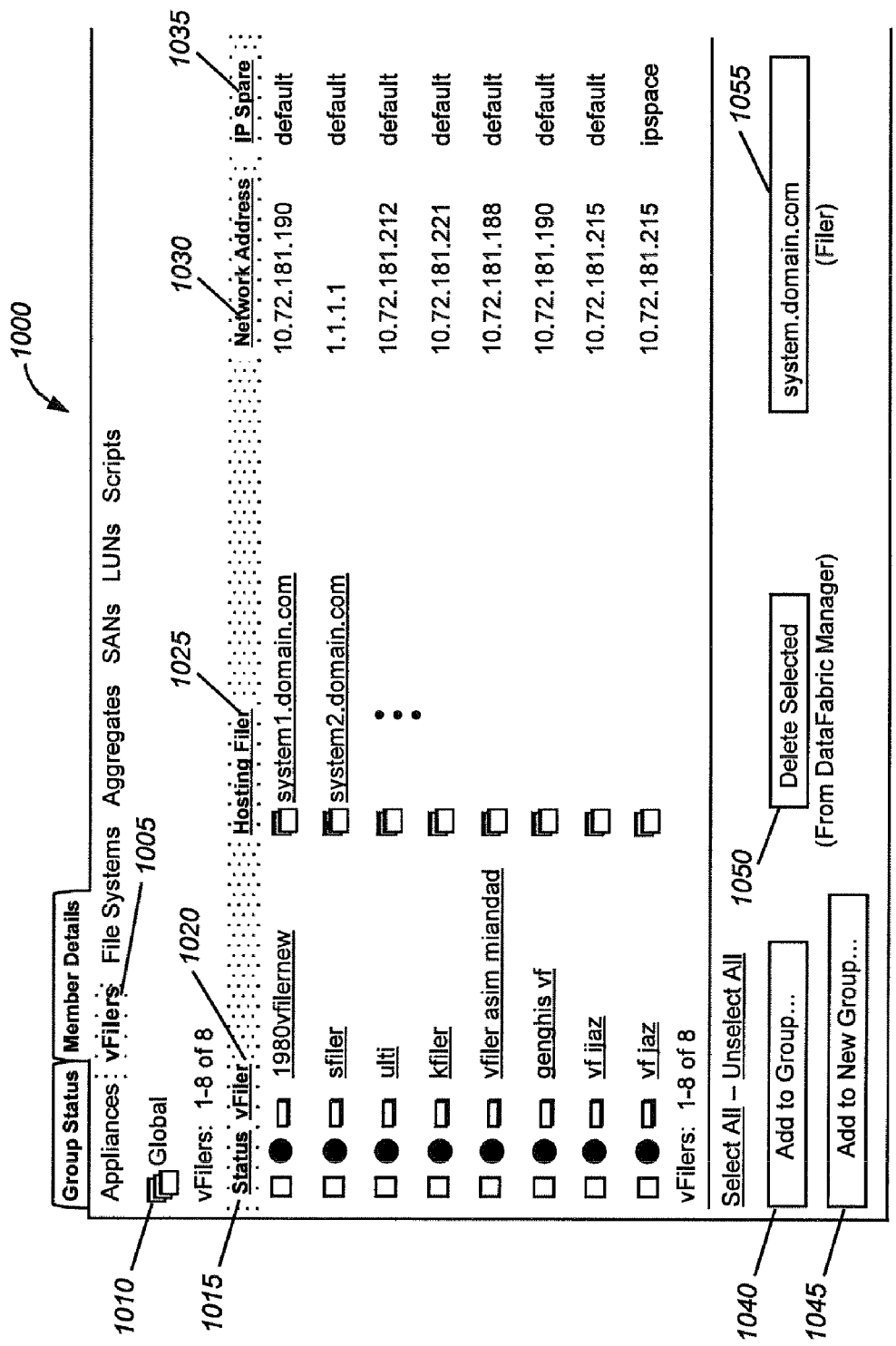
FIG. 10 is a screenshot of a GUI window illustrating a details relating to members of a group in accordance with an illustrative embodiment of the present invention.

FIG. 10 is a screenshot of a graphical user interface window 1000 illustrating member details of vfilers in accordance with an embodiment of the present invention. Specifically, the window 1000 illustrates that a tab 1005 for vfilers has been selected. A global display option 1010 enables a vfiler administrator to view a global display of all vfilers that are members of a particular group. Window 1000 also includes a number of fields including, for example, a status field 1015, a vfilers field 1020, a hosting storage system field 1025, a network address field 1030 and an IPspace field 1035. The status field 1015 may include a color-coded icon to signify the current status of the vfiler. The vfiler field 1020 identifies the name of a particular of vfiler. The hosting storage system field 1025 identifies the physical storage system on which the vfiler is executing. The network address field 1030 identifies the network address associated with a particular vfiler. The IPspace field 1035 identifies a particular IPspace associated with vfiler. As noted, in accordance with the principles of the present invention, only those vfilers to which an administrator has permissions are displayed. Thus, by forming groups, a SSP may effectively segregate information relating to non-managed vfilers and/or physical storage systems from vfiler administrators.

Figure 11:
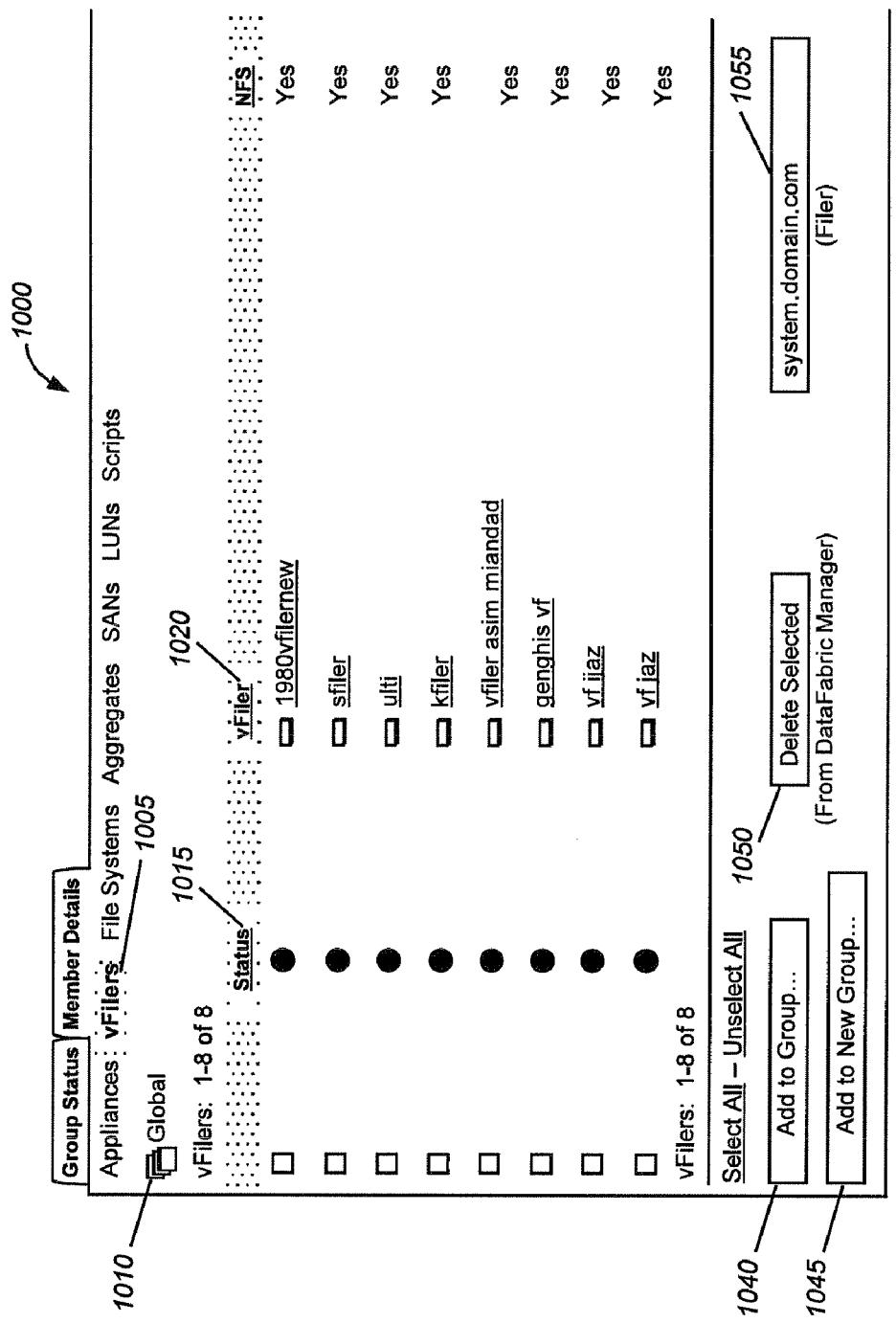
FIG. 11 is a screenshot of a GUI window illustrating protocols accessible by a virtual server in accordance with an illustrative embodiment of the present invention.

FIG. 11 is a screenshot of a graphical user interface window 1100 displaying protocols executable on vfilers in accordance with an embodiment of the present invention. The window 1100 includes a number of fields such as, for example, a status field 1015, a vfiler field 1020 and one or more protocol fields, such as an NFS field 1105. As noted above in reference to FIG. 10, the status field 1015 may include a color-coded status indicator. The vfiler field 1020 identifies the name of a particular vfiler. The protocol fields, such as NFS field 1105, identifies whether a particular protocol is licensed for use with the particular vfiler. It should be noted that while the present description of FIG. 11 is written in terms of NFS, the principles of the present invention may be utilized with any applicable protocols. Thus, for example, window 1100 may have a plurality of protocol fields 1105. As such, the description of an NFS field 1105 should be taken as exemplary only.

Figure 12:
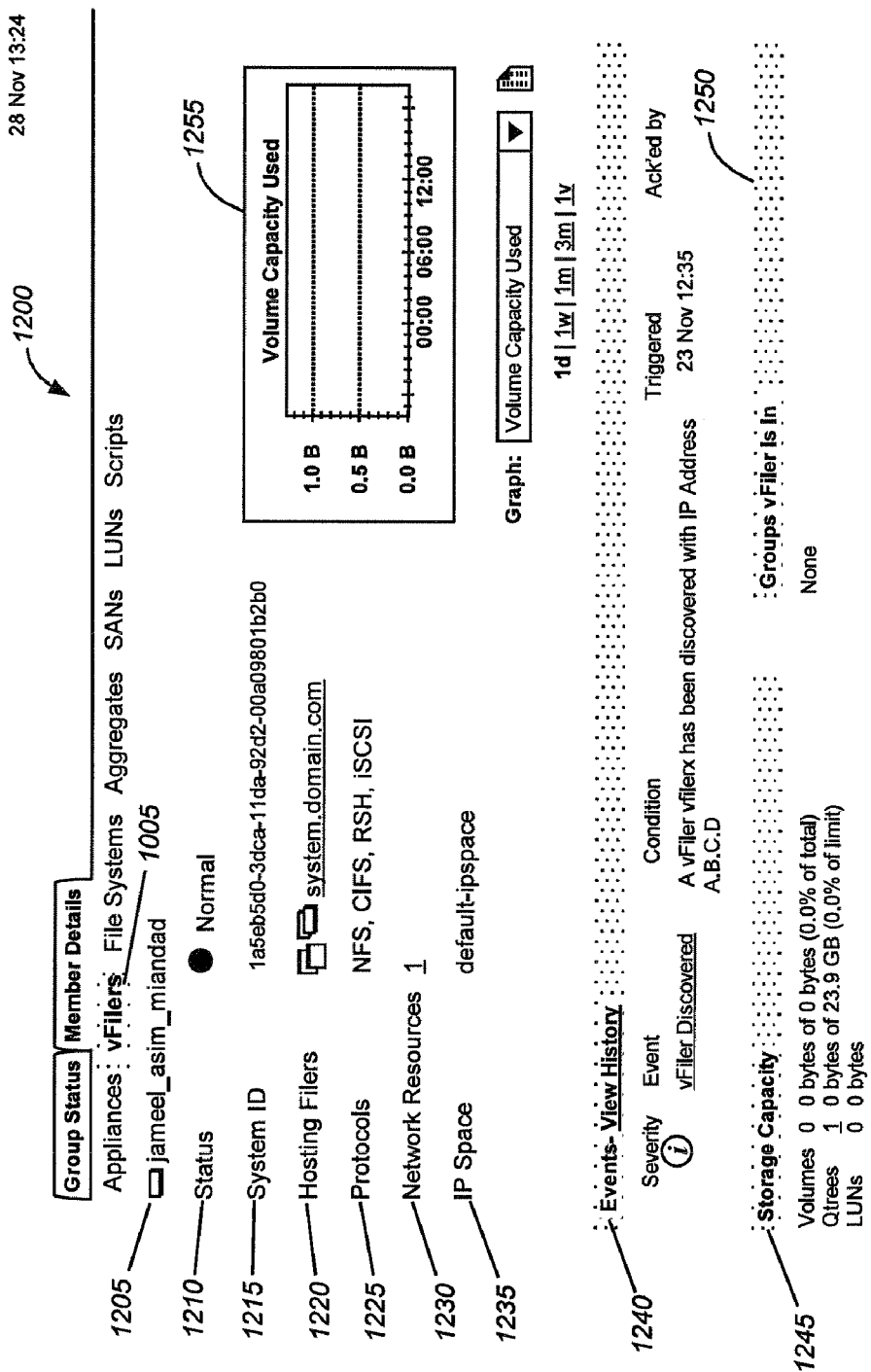
FIG. 12 is a screenshot of a GUI window illustrating details relating to a virtual server in accordance with an illustrative embodiment of the present invention.

FIG. 12 is a screenshot of the graphical user interface window 1200 illustrating vfiler details in accordance with an embodiment of the present invention. The window 1200 displays the name of the vfiler in field 1205. Furthermore, the window 1200 includes a status field 1210, a system ID field 1215, a hosting storage system field 1220, a protocols field 1225, a network resources field 1230 and an IPspace field 1235. The status field 1210 is illustratively a color-coded status indicator showing the overall status of the vfiler. The system ID field 1210 includes an alphanumeric identifier of the vfiler. In alternate embodiments, other formats of IDs may be utilized, such as, e.g., a numeric identifier. The hosting storage system field 1220 identifies the physical storage system on which the vfiler is executing. In accordance with an illustrative embodiment of the pre-sent invention, the name of the hosting storage system, i.e., the physical storage system hosting a vfiler, is not displayed to vfiler administrators.

The protocols field 1225 indicates those protocols currently usable by the vfiler. The network resources field 1230 identifies a total number of network resources utilized by the vfiler. The IPspace field 1235 identifies the current IPspace utilized by the vfiler. Window 1200 also includes an events field 1240 illustrating recently occurring events associated with the vfiler. Furthermore, a storage capacity field 1245 identifies volumes, qtrees and luns associated with a particular vfiler. It should be noted that in accordance with the principles of the present invention, aggregates hosting volumes are typically not displayed, as an aggregate is generally owned by the physical storage system and not a particular vfiler. Thus, the present invention enables segregation of data to limit or provide security among various vfiler administrators to thereby prevent information regarding one vfiler administrator's vfilers from being viewed by other administrators. A groups field 1250 identifies those groups with which the vfiler is a member.

Figure 13:
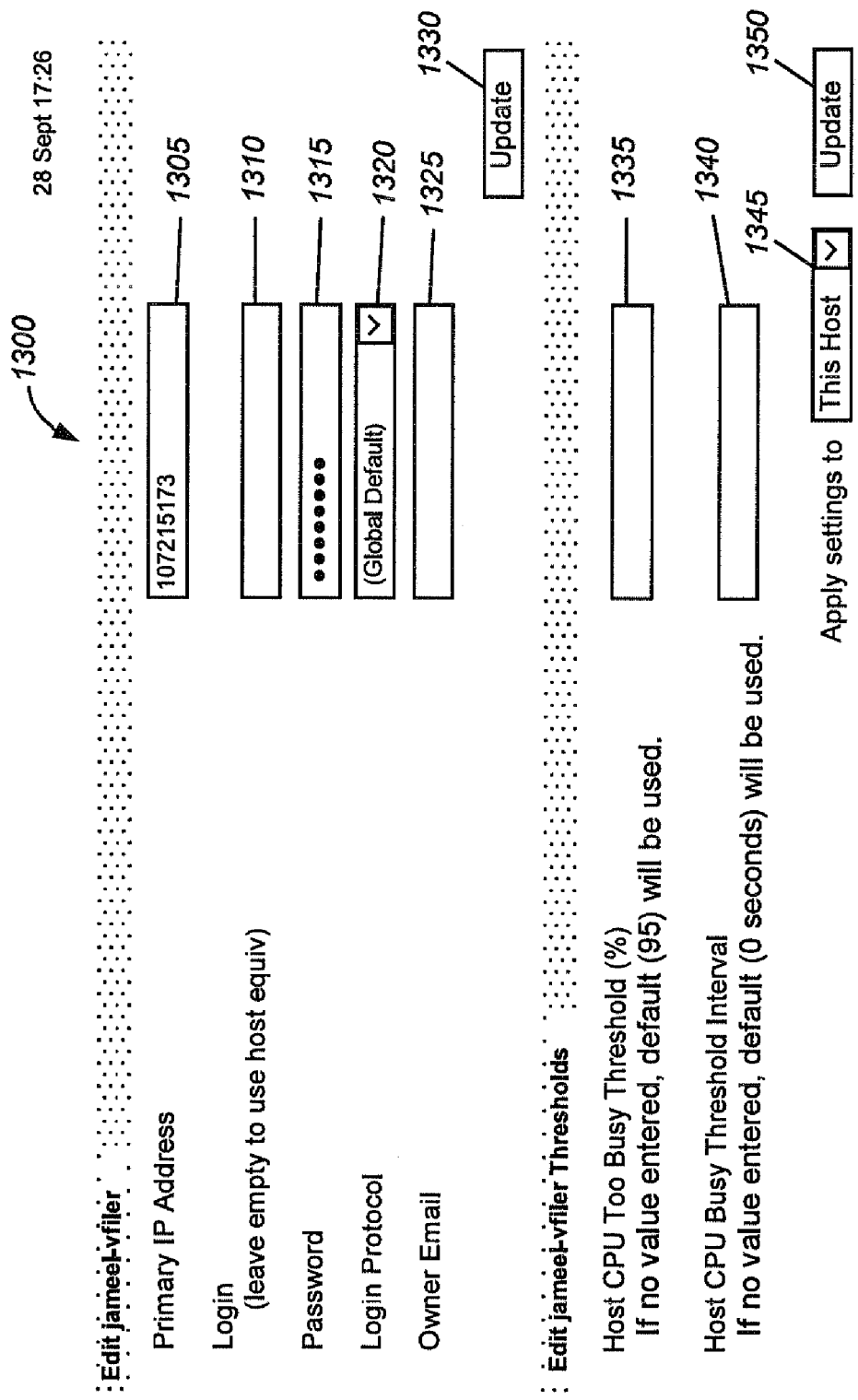
FIG. 13 is a screenshot of a GUI window illustrating the editing of virtual server settings accordance with an illustrative embodiment of the present invention.

FIG. 13 is a screenshot of a graphical user interface window 1300 for editing vfiler settings in accordance with an embodiment of the present invention. The window 1300 includes a field for a primary IP address 1305, a login field 1310, a password field 1315, a login protocol field 1320 and an owner e-mail field 1325. The primary IP address field 1305 enables a vfiler administrator to modify the primary Internet Protocol (or other network) address associated with a particular vfiler. The login field 1310 enables a vfiler administrator to generate a specialized login for management of the vfiler. Similarly, the password field 1315 provides a password for use with the login described within login field 1310. The login protocol field 1320 identifies the protocol to be utilized for login operations, e.g., Telnet, RSH, etc. The owner e-mail field 1325 identifies an e-mail address of the owner of the particular vfiler. In the illustrative embodiment, alert messages may be sent to the owner e-mail. An update button 1330 is utilized to update information entered into fields 1305-1325.

Furthermore, window 1300 includes a number of thresholds fields such as, for example, a too busy threshold field 1335 and/or a busy threshold interval 1340. The too busy threshold field 1335 identifies a percentage value at which the physical storage system central processing unit is deemed to be too busy and potential vfiler migration and/or other load-balancing techniques can be utilized. Similarly, the threshold interval field 1340 identifies a number of seconds to wait between checking for the too busy threshold. Once an administrator enters values into fields 1335, 1340, an update button 1350 may be selected to effectuate the changes.

Figure 14:
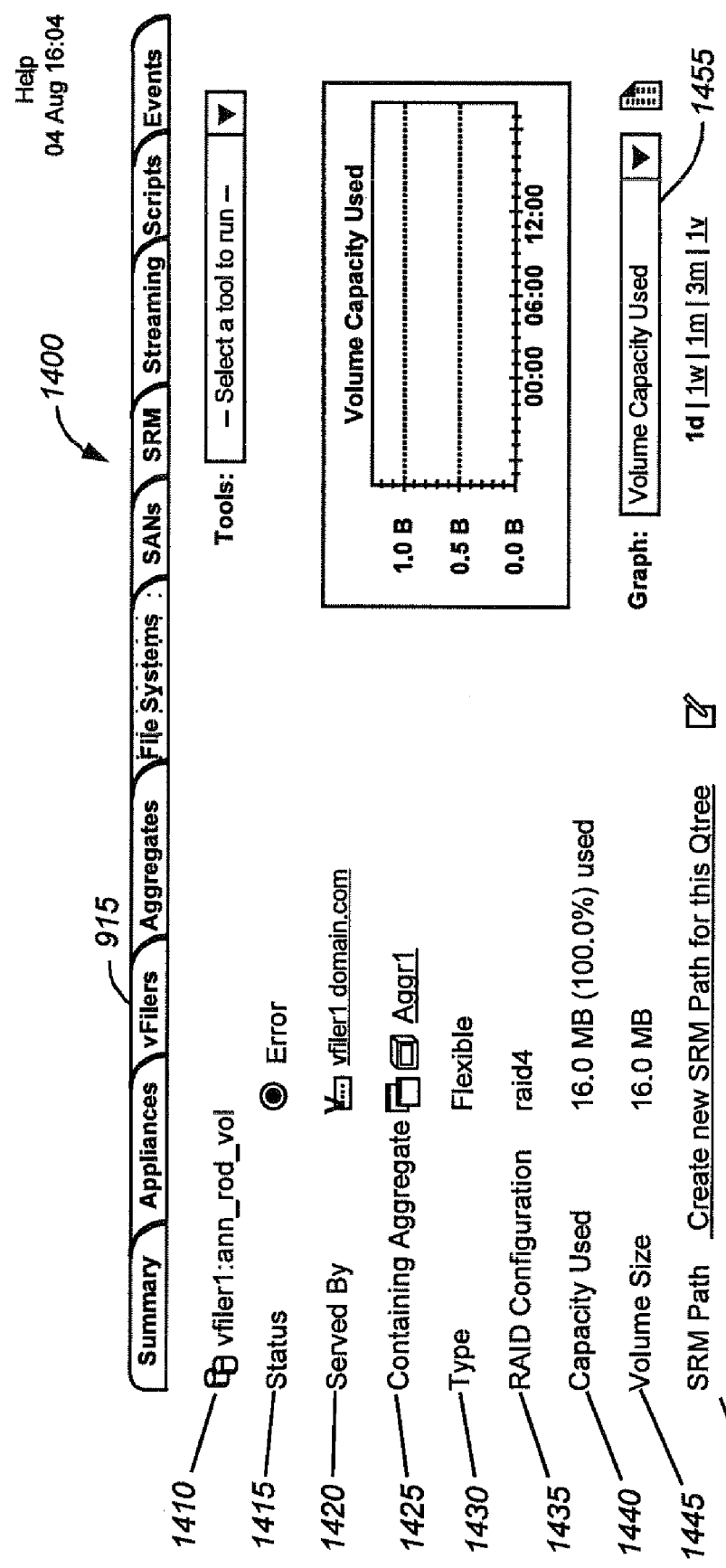
FIG. 14 is a screenshot of a GUI window illustrating the volume details in accordance with an illustrative embodiment of the present invention.

FIG. 14 is a screenshot of a graphical user interface window 1400 illustrating volume details in accordance with an embodiment of the present invention. The window 1400 illustratively indicates that a file systems tab 1405 has been selected. The window 1400 includes an identifier of the path of a volume 1410. Furthermore, the window 1400 includes a status field 1415, a served by field 1420, an aggregate field 1425, a type field 1430, a RAID configuration field 1435, a capacity used field 1440, a volume size field 1445 and an SRM path field 1450. The status field 1415 may include a color-coded status indicator of the volume. The served by field 1420 identifies the vfiler that is currently servicing the volume. The aggregate field 1425 identifies the aggregate that contains this volume. If the volume is a physical volume (as opposed to a flexible volume), then the aggregate field 1425 may be empty. The type field 1430 identifies the type of volume, e.g., physical, flexible, etc. The RAID configuration field 1435 identifies the RAID (or other parity) configuration utilized to provide data protection. For example, the RAID configuration field 1435 may indicate that RAID level 4 configuration is utilized. The capacity used field 1440 identifies the total amount of storage space used by the volume, while the volume size field 1445 indicates the maximum size of the volume. For vfiler administrators, certain information, e.g., the containing aggregate field 1425 and the RAID configuration field 1435 are not displayed in accordance with an illustrative embodiment of the present invention.

Figure 15:
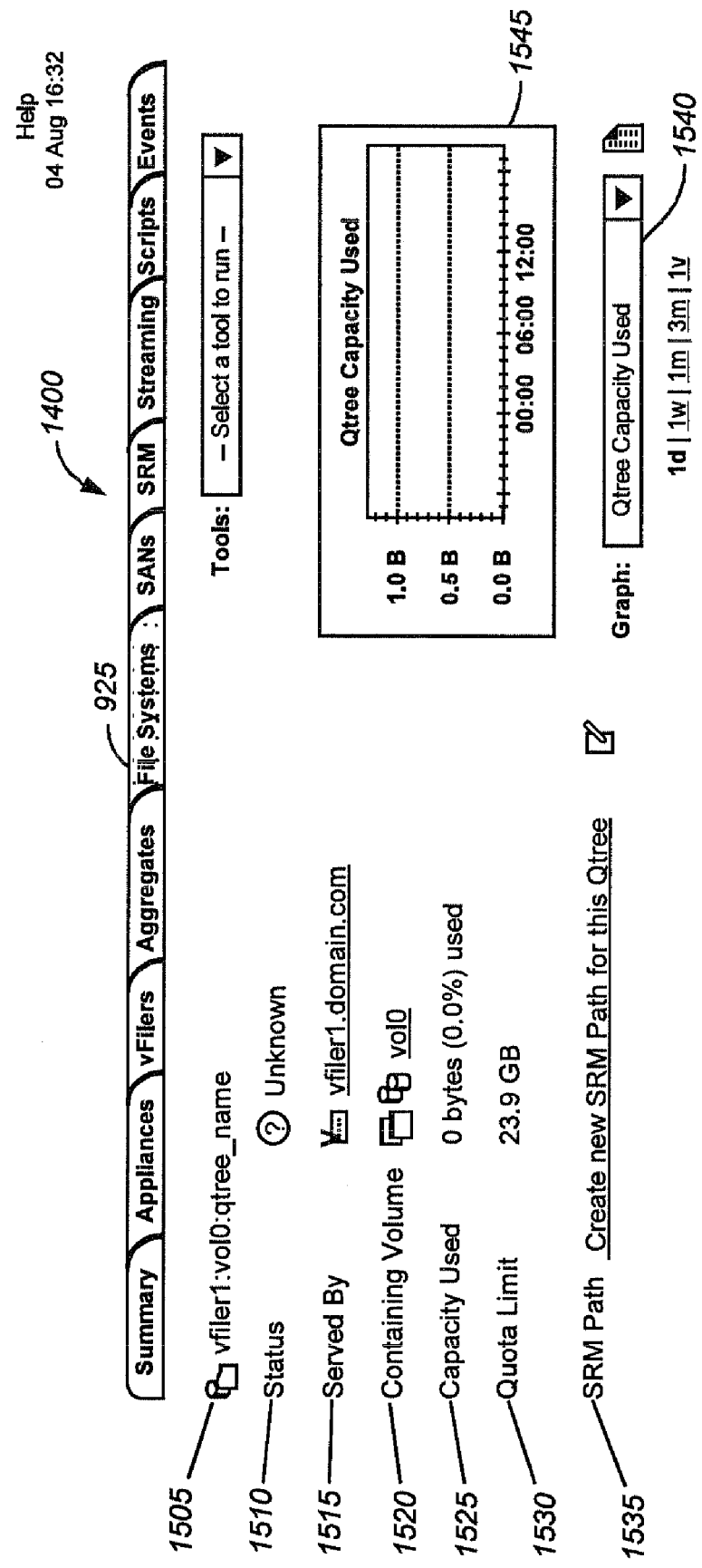
FIG. 15 is a screenshot of a GUI window illustrating details relating to a q tree in accordance with an illustrative embodiment of the present invention.

FIG. 15 is a screenshot of a graphical user interface window 1500 illustrating qtree details in accordance with an embodiment of the present invention. The window 1500 includes an identifier of the path of a qtree 1505. Furthermore, the window 1500 includes a status field 1510, a served by field 1515, a volume field 1520, a capacity used field 1525, and a quota limit field 1530. The status field 1510 may include a color-coded status indicator of the qtree. The served by field 1515 identifies the vfiler that is currently servicing the qtree. The volume field 1520 identifies the volume that contains this qtree. The capacity used field 1525 identifies the total amount of storage space used by the qtree, while the quota limit field 1530 indicates the maximum size of the qtree. For vfiler administrators, certain information, e.g., the containing volume field 1520 may not be displayed in accordance with an illustrative embodiment of the present invention.

FIG. 16 is a screenshot of a graphical user interface window 1600 for editing quota settings in accordance with an embodiment of the present invention. The window 1600 includes a disk space used field 1605, a disk space hard limit field 1610, a disk space soft limit field 1615, a disk space threshold field 1620, a files used field 1625, a files hard limit field 1630 and a files soft limit field 1635. The disk space used field 1605 identifies the storage space currently utilized by a given user on a qtree. The disk hard and soft limit fields 1610, 1615 may be utilized to set hard and/or soft upper size limits for storage space utilized. Illustratively, a hard limit is a limit that may not be exceed, while a soft limit is a limit that may be temporarily exceeded for a predetermined amount of time. Soft limits enable users to exceed a quota for short periods of time to deal with unexpected storage space requirements. The threshold field 1620 identifies a percentage of space size at which warning messages may be issued to a user. The files used field 1625 identifies the current number of files contained within the qtree. The hard and soft limit fields 1630, 1635 enable the administrator to set hard/soft limits on the number of files allowable by a user. Once information is entered into the various fields, the vfiler administrator may select an update button 1640 to update the appropriate quota settings. A pending jobs field 1645 identifies pending jobs for editing quotas of vfilers. A completed jobs field 1650 identifies jobs which have completed.

Figure 17:
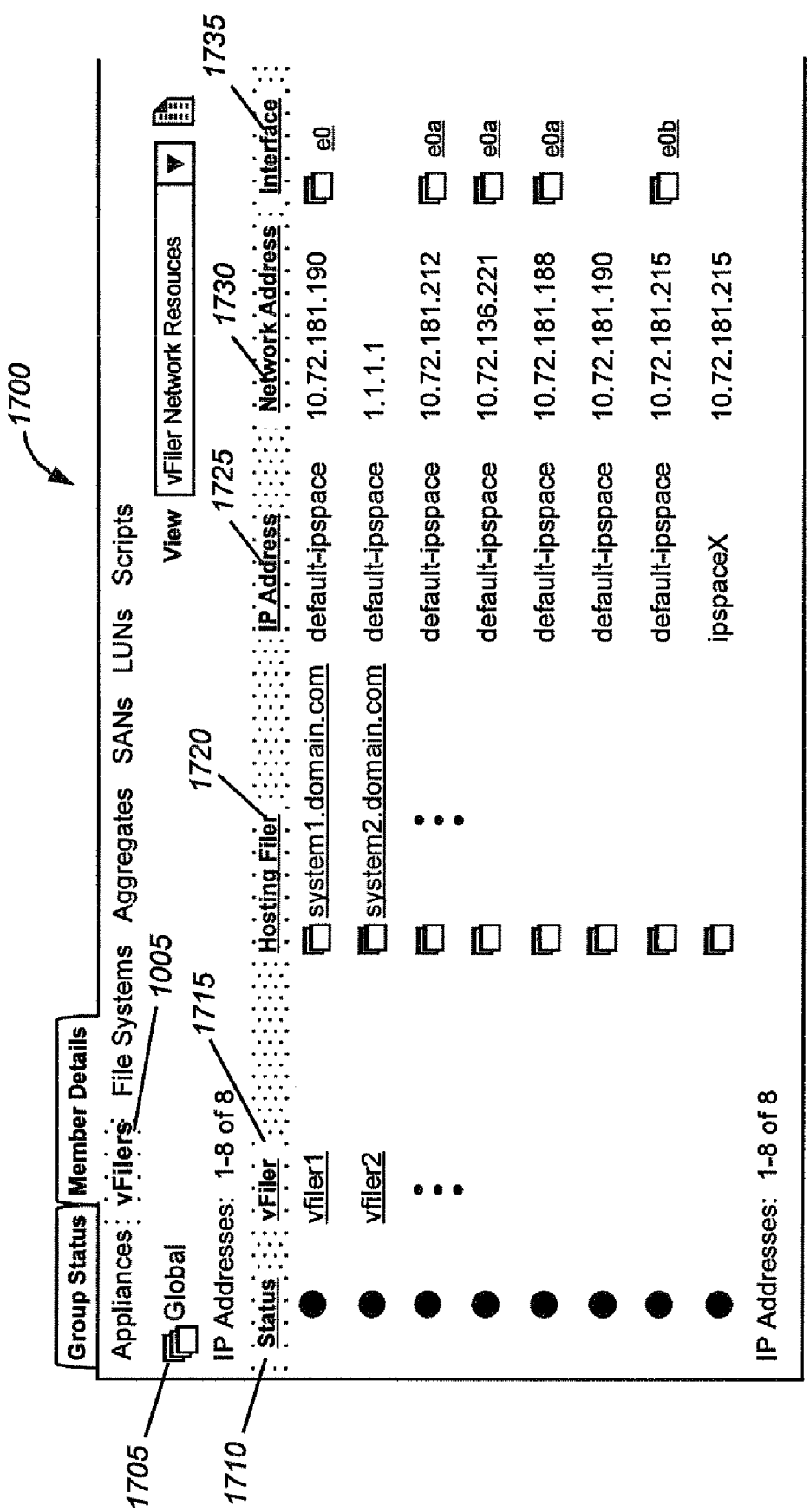
FIG. 17 is a screenshot of a GUI window illustrating virtual server network resource usage in accordance with an illustrative embodiment of the present invention.

FIG. 17 is a screenshot of a graphical user interface window 1700 illustrating usage of vfiler network resources in accordance with an illustrative embodiment of the pre-sent invention. The window 1700 shows that the vfilers tab 1005 has been selected. A global indicator 1705 illustrates that the view within window 1700 is a global view, i.e., one not limited to a particular location. The window 1700 includes a status field 1710, a vfiler field 1715, a hosting filer field 1720, an IPspace field 1725, an IP address field 1730 and an interface field 1735. The status field 1710 illustratively includes a color coded indicator of the overall status of the vfiler's network resources. The vfiler field 1715 identifies a vfiler, while the hosting filer field 1720 identifies the physical storage system on which the vfiler is currently executing. The IP space field 1725 identifies the IP space associated with a vfiler. The IP address field 1730 identifies the IP (or other network) address that the vfiler is currently utilizing. The interface field 1735 lists the physical interface to which the IP address is bound. In accordance with an embodiment of the present invention, the interface is not displayed to vfiler administrators as it relates to hardware on a physical storage system.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for administration of a plurality of virtual filers (vfilers) executing on one or more physical storage systems having at least one processor, the method comprising:
   assigning one or more vfilers of the plurality of vfilers to each group of a plurality of groups, wherein a vfiler is a partition of network and storage resources of the one or more physical storage systems allocated to the vfiler;
   granting an administrator permissions to a group of the plurality of groups; and
   in response to administration requests from the administrator, only displaying attributes associated with the one or more vfilers assigned to the group of the plurality of groups, wherein information associated with the one or more physical storage systems are not displayed.

2. The method of claim 1 wherein the attributes comprise aggregate information.

3. The method of claim 1 wherein the information comprises volume information.

4. The method of claim 1 wherein the information comprises identities of vfilers not associated with the group.

5. The method of claim 1 wherein assigning the one or more vfilers to the group further comprises using management software to create the group.

6. The method of claim 5 wherein the group comprises the one or more vfilers and one or more management objects.

7. The method of claim 6 wherein the one or more management objects comprises volumes.

8. The method of claim 6 wherein the one or more management objects comprise qtrees.

9. A system configured for administration of a plurality of virtual filers (vfilers) executing on one or more physical storage systems having at least one processor, the system comprising:
   a management server operatively interconnected with the one or more physical storage systems; and
   management software executing on the management server, the management software configured to:
   enable an association of one or more vfilers of the plurality of vfilers to each group of a plurality of groups wherein a vfiler is a partition of network and storage resources of the one or more physical storage systems allocated to the plurality of vfilers, and
   associate an administrator with each group and limit displays to only first information relating to the one or more vfilers associated with a group of the plurality of groups, without display of second information associated with the one or more physical storage systems.

10. The system of claim 9 wherein the group comprises the one or more vfilers and one or more management objects.

11. The system of claim 10 wherein the one or more management objects comprise volumes.

12. The system of claim 10 wherein the one or more management objects comprise qtrees.

13. The system of claim 9 wherein the management software is further configured to configure objects within the group.

14. The system of claim 9 wherein the management software implements a graphical user interface.

15. The system of claim 9 wherein the management software implements a command line interface.

16. The system of claim 9 wherein the management server comprises a physical storage system.

17. A system configured for administration of a plurality of virtual filers (vfilers) executing on one or more physical computers having at least one processor, the system comprising:
   a management server operatively interconnected with the one or more physical computers; and
   management software executing on the management server, the management software configured to:
      enable an association of one or more vfilers of the plurality of vfilers to each group of a plurality of groups wherein a vfiler is a partition of network and storage resources of the one or more physical storage systems allocated to the vfiler,
      associate an administrator with each group and
      display first information relating to the one or more vfilers associated with a group of the plurality of groups, whereby the management software does not provide the ability to display second information associated with the one or more physical computers executing the plurality of vfilers.

18. A non-transitory computer readable medium containing executable program instructions executed by a processor, comprising:
   program instructions that assign one or more virtual filers (vfilers) of a plurality of vfilers to each group of a plurality of groups, wherein a vfiler is a partition of network and storage resources of one or more physical storage systems allocated to the vfiler;
   program instructions that grant an administrator permissions to a group of the plurality of groups; and
   program instructions that only display attributes associated with the one or more vfilers assigned to the group, wherein information associated with the one or more physical storage systems, executing the plurality of vfilers, are not displayed, in response to administration requests from the administrator.

* * * * *